(12) United States Patent
Barton et al.

(10) Patent No.: US 12,538,114 B2
(45) Date of Patent: Jan. 27, 2026

(54) AI/ML ASSISTED ROAMING FOR WI-FI NETWORKS

(71) Applicant: Cisco Technology, Inc., San Jose, CA (US)

(72) Inventors: Robert Barton, Richmond (CA);
Federico Lovison, Fontanelle (IT);
Indermeet Gandhi, San Jose, CA (US);
Jerome Henry, Pittsboro, NC (US);
Sukrit Dasgupta, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 18/451,556

(22) Filed: Aug. 17, 2023

(65) Prior Publication Data

US 2024/0381066 A1  Nov. 14, 2024

Related U.S. Application Data

(60) Provisional application No. 63/501,789, filed on May 12, 2023.

(51) Int. Cl.
*H04W 8/02* (2009.01)
(52) U.S. Cl.
CPC ..................... *H04W 8/02* (2013.01)
(58) Field of Classification Search
CPC ....................................... H04W 8/02
See application file for complete search history.

(56) References Cited

U.S. PATENT DOCUMENTS 10,999,730 B2  5/2021  Ganu et al.
2020/0037392 A1  1/2020  Qui et al.
(Continued)

FOREIGN PATENT DOCUMENTS

CN   113498070 B   1/2023
WO   2021064713 A1  4/2021

OTHER PUBLICATIONS

Intel Corporation: "AI/ML Based Mobility Optimization", R3-213471, 3rd Generation Partnership Project (3GPP), Mobile Competence Centre, 650, Route Des Lucioles, F-06921 Sophia-Antipolis Cedex, France, vol. RAN WG3, No. Electronic Meeting, Aug. 16, 2021-Aug. 26, 2021, Aug. 6, 2021, pp. 1-10, XP052035299, Retrieved from https://www.3gpp.org/ftp/tsg_ran/WG3_lu/TSGR3_113-e/Docs/R3-213471.zip on Aug. 6, 2021, Section 2.1-2.2, pp. 2-3, paragraph [0002], figure 1.

(Continued)

*Primary Examiner* — Curtis B Odom
(74) *Attorney, Agent, or Firm* — Rutan & Tucker, LLP; Ravi Mohan (57) ABSTRACT

Described herein are devices, systems, methods, and processes for managing roaming actions in a wireless network. The embodiments utilize a machine learning model to generate roaming recommendations based on a plurality of roaming-related metrics. The metrics include data about the current network conditions, the station's previous roaming experiences, and the capabilities of potential roaming target candidates. The roaming recommendations can be provided to a station by an access point (AP). The station can then attempt to perform a roaming action based on the recommendations. After the attempt, the station transmits a roaming feedback to the AP, which includes data about the success or failure of the roaming action and any additional relevant data. In case the station rejects the roaming recommendations, the station may also provide a feedback indicating the rejection. The feedback is utilized to update the machine learning model, thereby improving the accuracy of future roaming recommendations.

20 Claims, 7 Drawing Sheets

(56) References Cited

U.S. PATENT DOCUMENTS

| | | |
|---|---|---|
| 2022/0150721 A1 | 5/2022 | Zebulon et al. |
| 2022/0383151 A1* | 12/2022 | Zeng .................... H04M 15/58 |
| 2023/0074297 A1 | 3/2023 | Thubert et al. |
| 2023/0091127 A1 | 3/2023 | Lin et al. |
| 2023/0143729 A1 | 5/2023 | Zohoorian et al. |

OTHER PUBLICATIONS

International Search Report and Written Opinion for International Application No. PCT/US2024/026594, mailed Aug. 2, 2024, 25 Pages.

* cited by examiner

AI/ML ASSISTED ROAMING FOR WI-FI NETWORKS

PRIORITY

This application claims the benefit of and priority to U.S. Provisional Application No. 63/501,789, filed May 12, 2023, which is incorporated in its entirety herein.

The present disclosure relates to wireless networking. More particularly, the present disclosure relates to enhancing the roaming experience of a station (STA) in a wireless network using machine learning techniques.

BACKGROUND

Wireless networks, such as those conforming to the institute of electrical and electronics engineers (IEEE) 802.11 standards, often include multiple access points (APs) and stations (STAs). STAs, which can be devices like smartphones or laptops, connect to the network through the APs. One of the challenges in such networks is managing the roaming process, which is when a STA transitions from being connected to one AP to another. This process is important for maintaining a stable and high-quality connection as the STA moves around within the network's coverage area.

Conventionally, the roaming process in wireless networks has been largely reactive and based on a single link between the STA and the AP. This means that a STA typically only starts the process of switching to a new AP when the connection to the current AP becomes too weak or unreliable. This reactive approach can lead to delays and disruptions in the STA's network connection, which can negatively impact the user experience, particularly for real-time applications like video streaming or online gaming.

The introduction of multi-link capability in the 802.11be standard has provided a potential way to improve the roaming process. With multi-link capability, a STA can maintain connections with two different APs simultaneously, potentially allowing for a smoother transition when roaming. However, without a mechanism for how an AP can recommend optimal roaming candidates for a STA, there may be a gap in the effective utilization of the multi-link capability.

SUMMARY OF THE DISCLOSURE

Systems and methods for incorporating sustainability data within a header of a data packet to allow for the generation of sustainable configurations for various network devices in accordance with embodiments of the disclosure are described herein. In some embodiments, a network node includes a processor, at least one network interface controller configured to provide access to a network, and a memory communicatively coupled to the processor, wherein the memory includes a roaming assistance logic. The logic is configured to collect a plurality of roaming-related metrics associated with a station and one or more roaming target candidates, generate one or more roaming recommendations based on a machine learning process and the collected plurality of roaming-related metrics, the one or more roaming recommendations including at least one confidence level for at least one roaming target candidate of the one or more roaming target candidates, and transmit the one or more roaming recommendations to the station.

In some embodiments, the one or more roaming target candidates correspond to one or more neighbor network nodes of the network node or one or more links of the one or more neighbor network nodes.

In some embodiments, the machine learning process is associated with a machine learning model trained at least in part on some of the plurality of roaming-related metrics.

In some embodiments, the machine learning model includes a reinforcement learning model.

In some embodiments, the roaming assistance logic is further configured to receive a roaming feedback from the station, and update the machine learning model based on the roaming feedback.

In some embodiments, the roaming feedback includes an indication of a successful roaming action at the station in accordance with at least one of the one or more roaming recommendations.

In some embodiments, the roaming feedback further includes at least one indication of one or more post-roaming action performance metrics.

In some embodiments, the roaming feedback includes an indication of a failed roaming attempt at the station in accordance with at least one of the one or more roaming recommendations.

In some embodiments, the roaming feedback further includes an indication of a reason associated with the failed roaming attempt.

In some embodiments, the roaming feedback includes an implicit roaming feedback.

In some embodiments, to update the machine learning model, the roaming assistance logic is further configured to record a reward or a penalty based on the roaming feedback.

In some embodiments, the plurality of roaming-related metrics includes an operation mode of the station or an operation mode of at least one of the one or more roaming target candidates.

In some embodiments, the plurality of roaming-related metrics includes at least one result associated with at least one previous roaming recommendation.

In some embodiments, the at least one result includes one or more post-roaming action performance metrics.

In some embodiments, the plurality of roaming-related metrics includes a roaming pattern associated with one or more stations.

In some embodiments, the one or more roaming recommendations further include an indication to perform a roaming action without scanning.

In some embodiments, the one or more roaming recommendations are associated with one or more links of a plurality of links for a multi-link operation (MLO) setup.

In some embodiments, the one or more roaming recommendations further include an indication of a timing of a roaming action for the station.

In some embodiments, a network device includes a processor, at least one network interface controller configured to provide access to a network, and a memory communicatively coupled to the processor, wherein the memory includes a roaming assistance logic. The logic is configured to receive one or more roaming recommendations from a network node, the one or more roaming recommendations being based on a machine learning process and including at least one confidence level for at least one roaming target candidate of one or more roaming target candidates, attempt to perform a roaming action based on the one or more roaming recommendations, and transmit a roaming feedback to the network node based on a successful or failed attempt to perform the roaming action.

In some embodiments, a method for recommending a roaming action includes collecting a plurality of roaming-related metrics associated with a station and one or more roaming target candidates, generating one or more roaming recommendations based on a machine learning process and the collected plurality of roaming-related metrics, the one or more roaming recommendations including at least one confidence level for at least one roaming target candidate of the one or more roaming target candidates, and transmitting the one or more roaming recommendations to the station.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can utilize machine learning processes to enhance the roaming experience of a station (STA) in a wireless network. In many embodiment, the mechanism may be fine-tuned for different environments and specific types of STAs. The approach can take into account factors such as, but not limited to, the current mode of the STA (e.g., enhanced multi-link single-radio (eMLSR), simultaneous transmit and receive (STR), non-simultaneous transmit and receive (NSTR), etc.) and the quality of previous roaming experiences of the STAs.

In a number of embodiments, a machine learning model can be trained using various input parameters. By way of non-limiting examples, the parameters may include the current mode of the STA, whether the STA accepted a previous roaming recommendation, the STA's experience after a roaming action (e.g., whether the post-roaming action experience of the STA or applications running at the STA represented an improvement or a degradation), and whether a recommendation is to be made for the STA to utilize one or both of the two links on a target access point (AP). Hereinafter a roaming action may refer to a roam where a STA switches its association to one or more new APs or one or more new links. The machine learning model can also take as an input parameter the multi-link operation (MLO) setup or mode to be recommended.

In a variety of embodiments, once the machine learning model is trained, it may be utilized by the AP or a network controller (which may manage one or more APs) to make roaming recommendations. In some embodiments, the recommendations can be conveyed to the STA utilizing an 802.11v (or simply "11v") basic service set (BSS) transition management (BTM) message (solicited or unsolicited). In more embodiments, the message may include a roaming confidence metric, which can be a measure of the likelihood that the recommended roaming action will be successful. By way of a non-limiting example, the recommendations may include a sorted list of multiple roaming target candidates (a roaming target candidate may include a neighbor AP or a link of a neighbor AP), where the list is sorted based on the roaming confidence metric. In additional embodiments, the confidence metric can be calculated using a conditional probability mechanism such as, but not limited to, Bayesian Inference, providing a quantifiable measure of the expected success of the recommended roaming action.

In further embodiments, the BTM message (e.g., a BSS transition request message) can include a field that indicates to the STA to trust the recommendations and just join/roam based on the recommendations without scanning. Because the conventional scanning process for the roaming action can consume time and resources, executing a roaming action without scanning can help to reduce energy usage. In still more embodiments, a feedback loop may be utilized to refine the machine learning model, where the STA can provide feedback on the accuracy of the roaming recommendations. This feedback can be used to further train and improve the machine learning model.

In still further embodiments, the machine learning model can incorporate a reward/penalty recording system as part of the reinforcement learning process. The system can assign or otherwise record rewards or penalties based on the success or failure of the roaming recommendations. For instance, if a roaming recommendation results in a successful roaming action with improved network performance, the model may receive a reward. Conversely, if a recommendation leads to a failed roam or degraded performance, the model may receive a penalty. The reward/penalty system can help the machine learning model to learn more effectively from past experiences and improve the accuracy of future recommendations.

In still additional embodiments, the reinforcement learning model can utilize various key performance indicators (KPIs) as input to evaluate the success of the roaming process. By way of a non-limiting example, one such KPI may be the roaming patterns of the STAs. If a STA roams to a recommended neighbor, this can act as a reward for the machine learning model. In some more embodiments, the success or failure rate of STAs roaming to the recommended neighbors (neighbor APs) can also be used as a KPI. A successful roaming action to a recommended neighbor AP can represent a reward for the machine learning model, while a failed roaming action can represent a penalty. In certain embodiments, the reinforcement learning model can also consider application performance metrics such as, but not limited to, jitter, latency, and loss, as well as radio frequency (RF) metrics such as, but not limited to, received signal strength indicator (RSSI), signal-to-noise ratio (SNR), and downlink (DL)/uplink (UL) data rates. The model can evaluate how these metrics change before and after a roaming action, and/or for STAs roaming to recommended versus non-recommended neighbor APs. In particular, an improvement in application performance and/or RF metrics after a roaming action to a recommended neighbor AP can also represent a reward for the machine learning model.

In yet more embodiments, the AP or the network controller can also predict the optimal timing for a roaming action by examining DL data in the AP's buffer. Based on the depth of the buffer, the machine learning model may infer the best time for the STA to perform the roaming action. In still yet more embodiments, if the STA follows the BTM recommendation, the AP may give preference to the STA (e.g., through at least one extra transmit (Tx) operation). In many further embodiments, the AP or the network controller can also predict the optimal timing for a roaming action by examining UL data in the STA's buffer (e.g., based on buffer status reports). In many additional embodiments, the AP or the network controller can also try to predict the optimal roaming time when the buffers are at a minimum utilizing long short-term memory (LTSM) to determine DL and UL buffer statuses, alongside reinforcement learning for the actual roaming path recommendation.

Accordingly, embodiments may provide a proactive and intelligent approach to managing the roaming process in a wireless network, potentially leading to a smoother and more reliable network connection for STAs. By leveraging machine learning and considering a variety of factors, the AP or network controller can make more accurate roaming recommendations, reducing the need for time-consuming scans and minimizing disruptions to the STA's network connection. Furthermore, the use of a feedback loop and a reward/penalty system can allow the machine learning model to continuously learn and adapt based on the STA's experiences, further enhancing the effectiveness of the recommendations over time.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
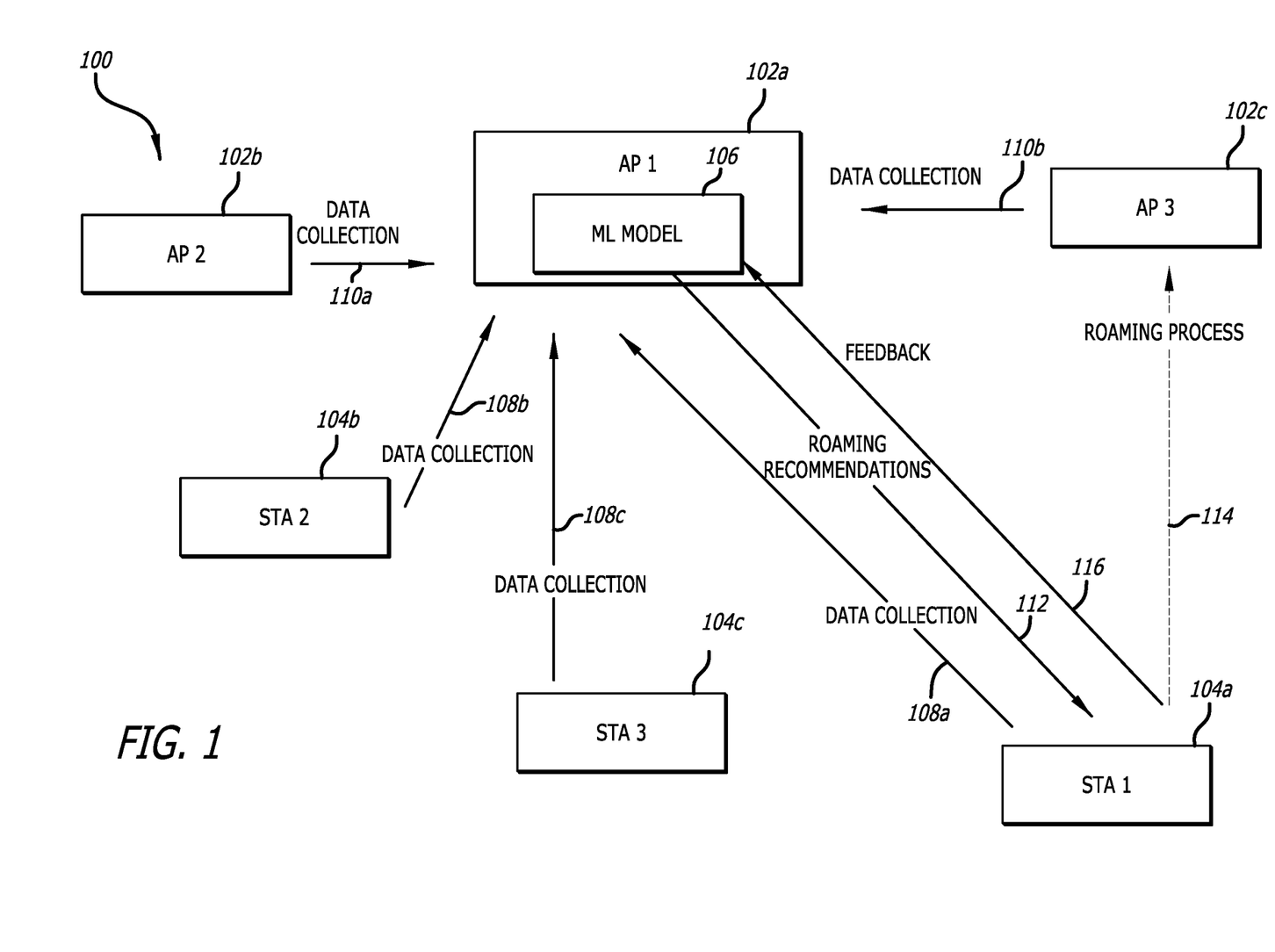
FIG. 1 is a diagram illustrating a wireless network environment in accordance with various embodiments of the disclosure.

Referring to FIG. 1, a diagram illustrating a wireless network environment 100 in accordance with various embodiments of the disclosure is shown. The embodiment depicted in FIG. 1 may include three APs, AP 1 102a, AP 2 102b, and AP 3 102c, and three STAs, STA 1 104a, STA 2 104b, and STA 3 104c. In many embodiments, AP 1 102a may be equipped with a machine learning (ML) model 106. Although the ML model is hosted at AP 1 102a in the embodiment depicted in FIG. 1, in a number of embodiments (not shown), a similar ML model may be hosted at a network controller that may manage one or more APs. The ML model 106 can be trained using various input parameters collected from the network. The parameters may include data from both the APs (e.g., neighbor APs) and the STAs. By way of a non-limiting example, data from AP 2 102b and AP 3 102c can be collected and sent to AP 1 102a, as indicated by arrows 110a and 110b. Similarly, data from STA 1 104a, STA 2 104b, and STA 3 104c can be collected and sent to AP 1 102a, as indicated by arrows 108a, 108b, and 108c.

In a variety of embodiments, the collected data may include, by way of non-limiting examples, the current mode of the STAs, whether the STA (e.g., STA 1 104*a*) accepted a previous roaming recommendation, the STA's experience after a roaming action, and/or whether a recommendation is to be made for the STA to utilize one or both of the two links on a target AP. In some embodiments, the ML model 106 at AP 1 102*a* can utilize the collected data to generate informed roaming recommendations. The roaming recommendations 112*a* can be conveyed to STA 1 104*a* and can suggest the optimal AP for STA 1 104*a* to roam to, based on the current network conditions and the STA's previous roaming experiences. In more embodiments, the recommendations may be conveyed using a BTM message. In additional embodiments, the message carrying the roaming recommendations may also include a roaming confidence metric. The metric (e.g., calculated using a conditional probability mechanism such as Bayesian Inference) may provide a quantifiable measure of the expected success of the recommended roaming action. By way of a non-limiting example, the BTM message may inform the STA 1 104*a* of a 98% probability that a roam to AP 3 102*c* will be successful and a 79% probability that a roam to AP 2 102*b* will be successful.

In further embodiments, at 114, STA 1 104 may perform the roaming process/action and switch its association to AP 3 102*c* based on the roaming recommendations 112*a*. In still more embodiments, STA 1 104*a* may have followed the recommendation from ML model 106 and successfully roamed to AP 3 102*c*. However, in still further embodiments, it may also be possible that STA 1 104*a* may reject the recommendation or that the roaming action may fail. In still additional embodiments, STA 1 104*a* may provide a feedback 116 to ML model 106. The feedback can include data about the success or failure of the roaming action, changes in network performance metrics, and/or whether the STA accepted the roaming recommendation. The feedback can be used to further train and improve the ML model 106 through a reinforcement learning process, which can incorporate a reward/penalty system based on the success or failure of the roaming recommendations.

Although a specific embodiment for a wireless network environment suitable for carrying out the various steps, processes, methods, and operations described herein is discussed with respect to FIG. 1, any of a variety of systems and/or processes may be utilized in accordance with embodiments of the disclosure. For example, the machine learning model can be trained using a deep learning process, which can handle more complex data and provide more accurate roaming recommendations. The elements depicted in FIG. 1 may also be interchangeable with other elements of FIGS. 2-8 as required to realize a particularly desired embodiment.

Figure 2:
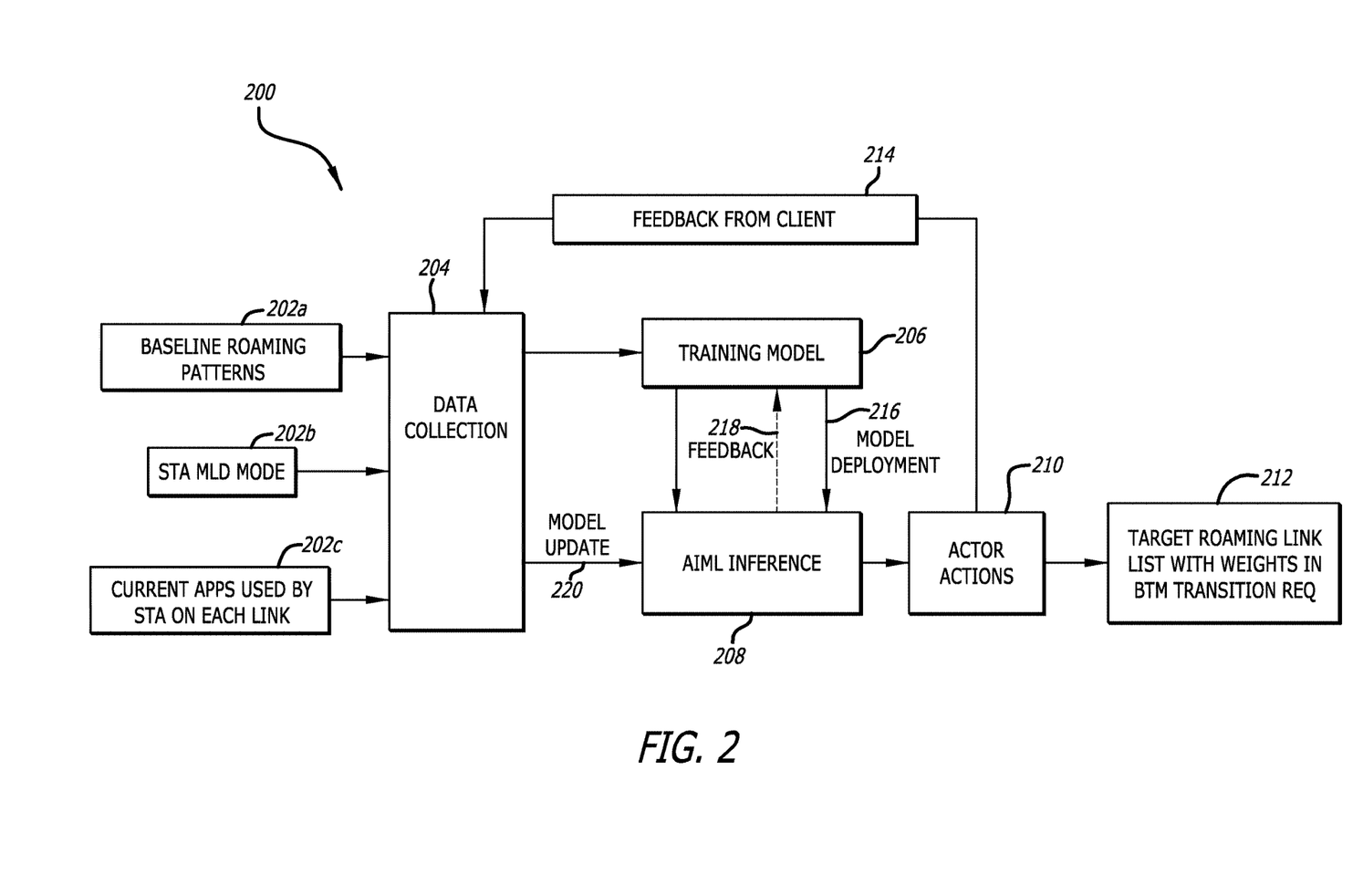
FIG. 2 is a diagram illustrating a machine learning-based roaming assistance process in accordance with various embodiments of the disclosure.

Referring to FIG. 2, a diagram 200 illustrating a machine learning-based roaming assistance process in accordance with various embodiments of the disclosure is shown. The embodiment depicted in FIG. 2 includes a data collection block 204, a training model block 206, an artificial intelligence (AI)/ML inference block 208, and an actor actions block 210. In many embodiments, the data collection block 204 may serve as the initial point of the process, gathering various types of data from the network. The data can include baseline roaming patterns 202*a*, which can be, by way of a non-limiting example, determined by utilizing a Markov decision process. The data can also include the current multi-link dual-band (MLD) mode 202*b* of the STA, which can be, by way of non-limiting examples, eMLSR, STR, or NSTR. Additionally, the data can relate to the current applications 202*c* used by the STA on each link.

In a number of embodiments, the collected data may then be used to train the machine learning model at block 206. The trained model can then be deployed, at 216, to the AI/ML inference block 208. In a variety of embodiments, the AI/ML inference block 208 may utilize the deployed model to make informed decisions about STA roaming. The decisions, which can be recommendations for optimal roaming actions, may then be conveyed to the actor actions block 210. In some embodiments, the actor actions block 210 may formulate the roaming recommendations into a format that can be communicated to the STA. The formulating can include, by way of a non-limiting example, outputting a target roaming link list 212 with weights in a BTM transition request message. The list may provide confidence metrics for each candidate (e.g., new APs and/or links) in the BTM message.

In more embodiments, feedback 214 from the client (e.g., the STA) can then be collected and sent back to the data collection block 204. The feedback can include implicit feedback determined by the AP infrastructure, such as, but not limited to, the application experiences of the new (post-roaming action) AP/link, how long the STA stayed on the new AP/link, and/or the time for roaming action (e.g., a fast roam or a slow roam, where a successful but slow roam may still lead to a penalty). The feedback can also include explicit feedback from the client (STA), such as a rejection code and reason, which can be used as a penalty in the reinforcement learning process. In additional embodiments, the AI/ML inference block 208 can also provide feedback 218 to the training model block 206. The feedback can be used to update the machine learning model at 220, further improving the accuracy of the roaming recommendations over time.

Although a specific embodiment for a machine learning-based roaming process suitable for carrying out the various steps, processes, methods, and operations described herein is discussed with respect to FIG. 2, any of a variety of systems and/or processes may be utilized in accordance with embodiments of the disclosure. For example, the machine learning model can be enhanced with a predictive analytics component, which can forecast future network conditions and adjust the roaming recommendations accordingly. The elements depicted in FIG. 2 may also be interchangeable with other elements of FIGS. 1 and 3-8 as required to realize a particularly desired embodiment.

Figure 3:
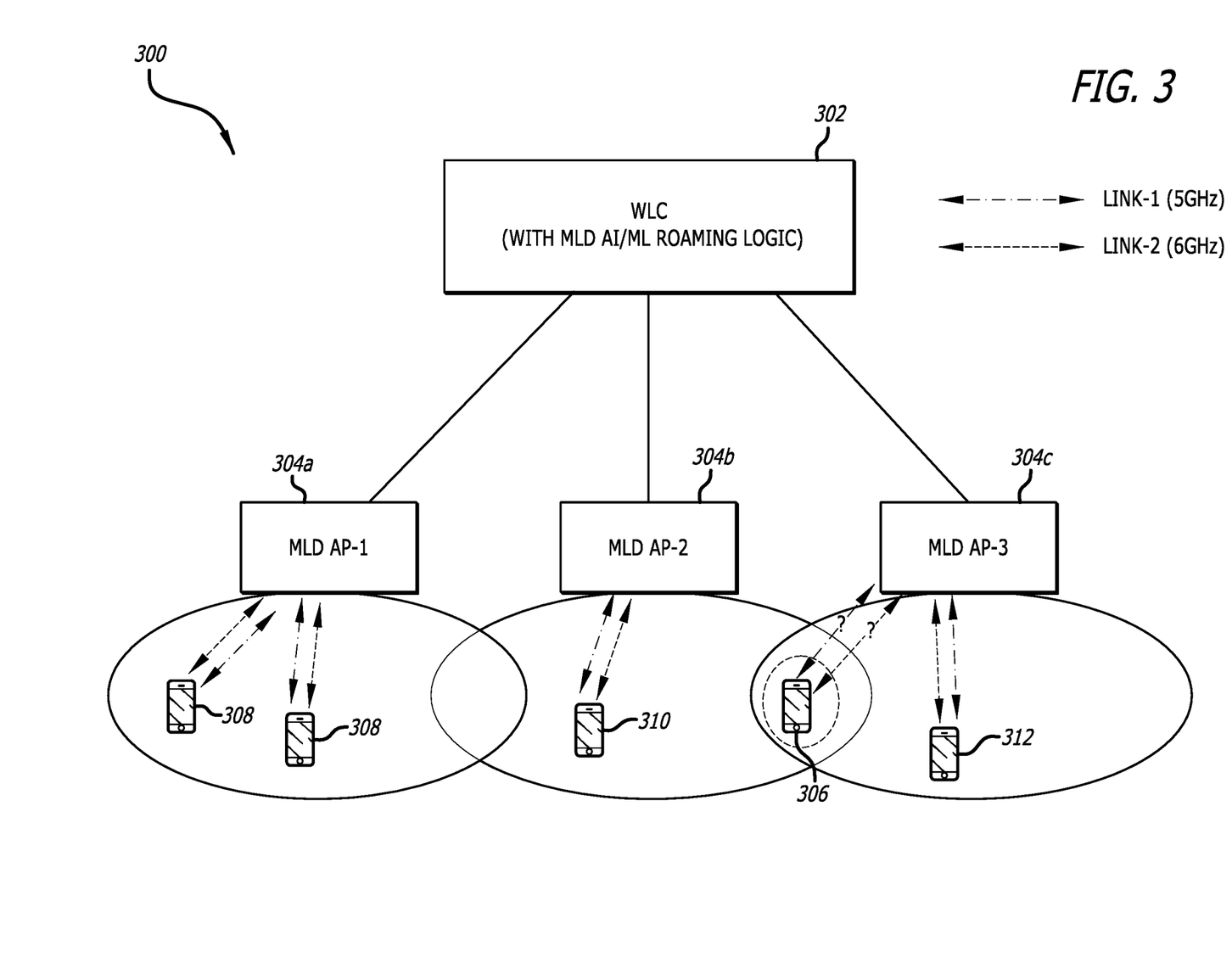
FIG. 3 is a diagram illustrating a wireless network environment that employs multi-link dual-band (MLD) access points (APs) and stations (STAs) in accordance with various embodiments of the disclosure.

Referring to FIG. 3, a diagram illustrating a wireless network environment 300 that employs MLD APs and STAs in accordance with various embodiments of the disclosure is shown. The network environment 300 may include a wireless local area network (LAN) controller (WLC) 302, which may be enhanced with an MLD AI/ML roaming logic. In many embodiments, the WLC 302, equipped with the MLD AI/ML roaming logic, may serve as the central control unit managing the MLD APs. In the embodiment depicted in FIG. 3, the MLD APs include MLD AP 1 304*a*, MLD AP 2 304*b*, and MLD AP 3 304*c*. The MLD AI/ML roaming logic within the WLC 302 can utilize a machine learning model to generate informed roaming recommendations based on various input parameters collected from the network.

In a number of embodiments, the network environment 300 may include five STAs. Specifically, MLD AP 1 304*a* may be associated with two STAs 308. MLD AP 2 304*b* may be associated with STA 310, and MLD AP 3 304*c* is associated with STA 306 and STA 312. Each STA can maintain a dual-link association with its respective AP, utilizing, by way of a non-limiting example, a 5 GHz link 1 and a 6 GHz link 2. The dual-link association can enhance network performance and provides flexibility during the roaming process. In a variety of embodiments, MLD AP 3 304c, under the guidance of the MLD AI/ML roaming logic in WLC 302, may provide roaming recommendations to STA 306. In some embodiments, by way of a non-limiting example, the recommendations can be based on the analysis at the machine learning model of the current network conditions and/or the STA's previous roaming experiences.

In more embodiments, the recommendations provided to STA 306 can include one or more of: 1) moving just link 1 to MLD AP 2 304b while keeping link 2 on MLD AP 3 304c, 2) moving just link 2 to MLD AP 2 304b while keeping link 1 on MLD AP 3 304c, or 3) moving both link 1 and link 2 to MLD AP 2 304b. In additional embodiments, the selection of the best recommendation to provide from these possibilities may be determined by the AI/ML model, which may take into account factors such as, but not limited to, network congestion, signal strength, and/or the STA's roaming history.

Although a specific embodiment for a wireless network environment with MLD APs and STAs suitable for carrying out the various steps, processes, methods, and operations described herein is discussed with respect to FIG. 3, any of a variety of systems and/or processes may be utilized in accordance with embodiments of the disclosure. For instance, the MLD AI/ML roaming logic can incorporate a real-time analytics component, enabling it to dynamically adjust roaming recommendations based on real-time network conditions. The elements depicted in FIG. 3 may also be interchangeable with other elements of FIGS. 1, 2 and 4-8 as required to realize a particularly desired embodiment.

Figure 4:
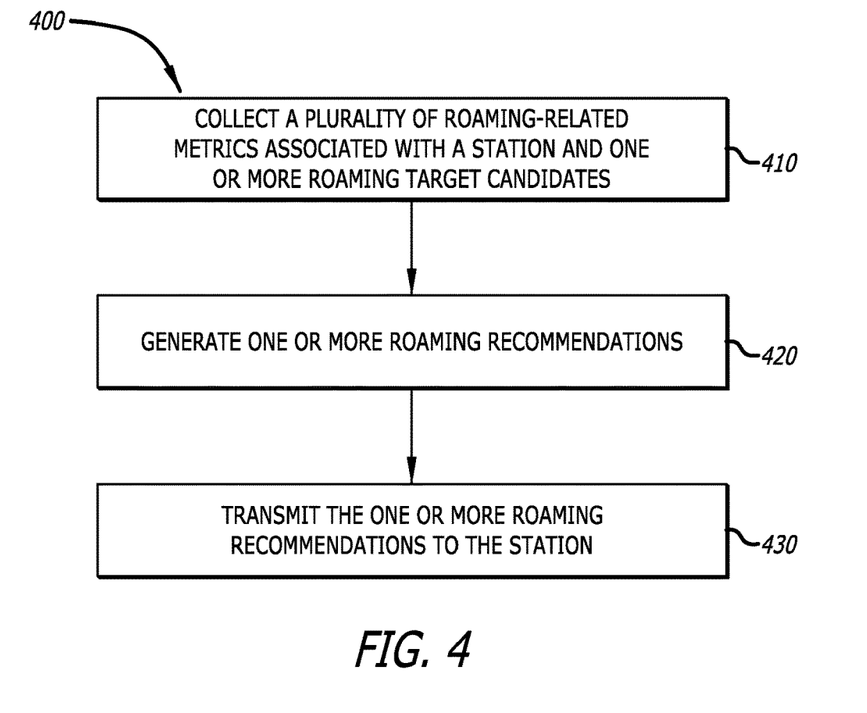
FIG. 4 is a flowchart showing a process for generating and transmitting roaming recommendations in accordance with various embodiments of the disclosure.

Referring to FIG. 4, a flowchart showing a process 400 for generating and transmitting roaming recommendations in accordance with various embodiments of the disclosure is shown. In many embodiments, the process 400 may collect a plurality of roaming-related metrics associated with a station and one or more roaming target candidates (block 410). The metrics can include, but are not limited to, the current network conditions, the station's previous roaming experiences, and the capabilities of the roaming target candidates. The collected metrics may serve as the input to the machine learning model, which can be utilized to generate the roaming recommendations.

In a number of embodiments, the process 400 may generate one or more roaming recommendations based on a machine learning process and the collected plurality of roaming-related metrics (block 420). The generated roaming recommendations can include at least one confidence level for at least one roaming target candidate of the one or more roaming target candidates. A roaming target candidate may be a neighbor network node (AP) or a link (e.g., a 5 GHz link or a 6 GHz link) at a neighbor network node. The confidence level may represent the likelihood of a successful roaming action if the station were to roam to the corresponding roaming target candidate.

In a variety of embodiments, the process 400 may transmit the one or more roaming recommendations to the station (block 430). The one or more roaming recommendations can be transmitted utilizing a BTM message. Upon receiving the roaming recommendations, the station can then decide whether to perform a roaming action based on the recommendations.

Although a specific embodiment for generating and transmitting roaming recommendations is discussed with respect to FIG. 4, any of a variety of systems and/or processes may be utilized in accordance with embodiments of the disclosure. For example, the process can be enhanced with a feedback loop, where the station provides feedback on the success or failure of the roaming action based on the recommendations. The elements depicted in FIG. 4 may also be interchangeable with other elements of FIGS. 1-3 and 5-8 as required to realize a particularly desired embodiment.

Figure 5:
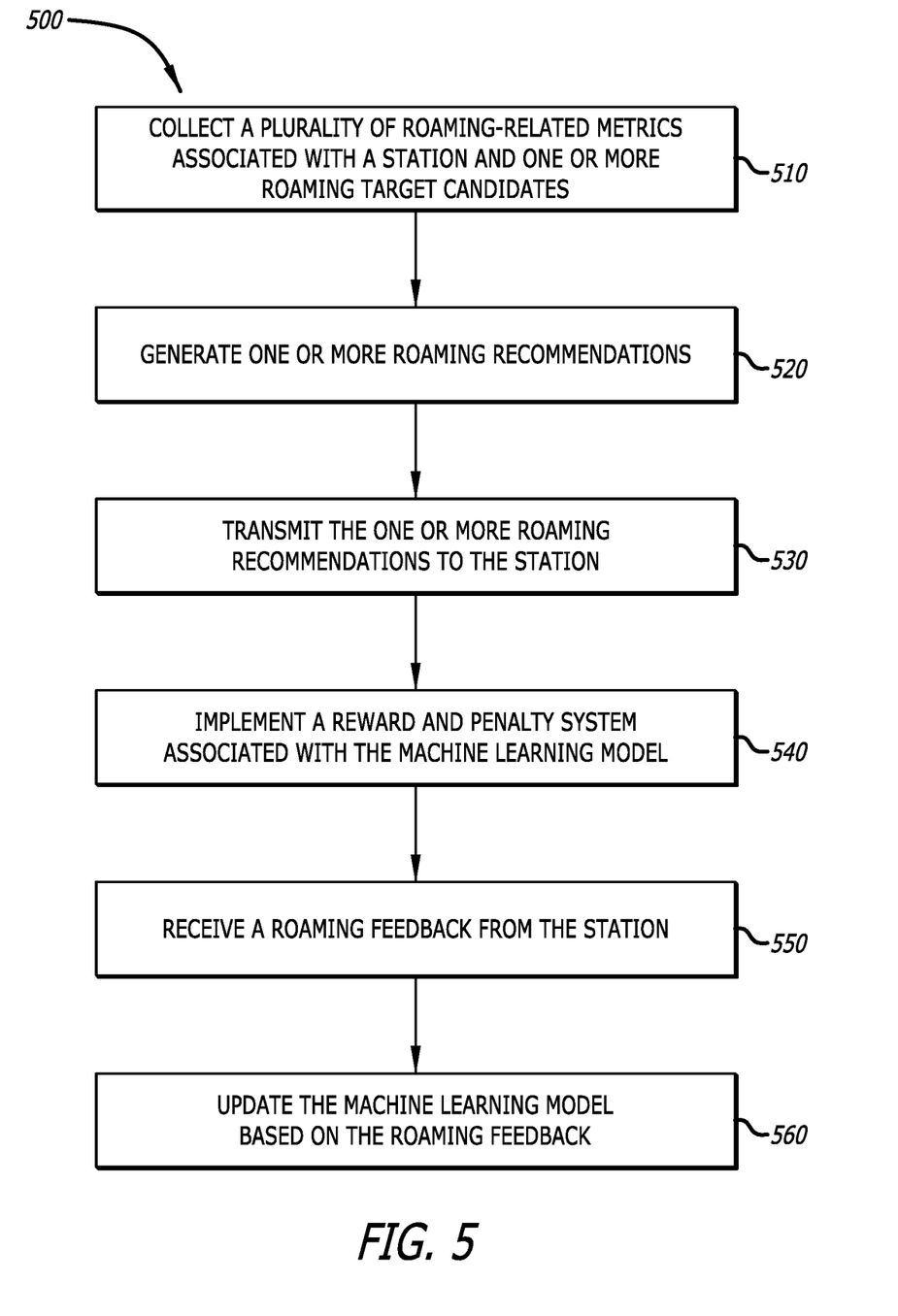
FIG. 5 is a flowchart showing a process for generating, transmitting, and refining roaming recommendations in accordance with various embodiments of the disclosure.

Referring to FIG. 5, a flowchart showing a process 500 for generating, transmitting, and refining roaming recommendations in accordance with various embodiments of the disclosure is shown. In many embodiments, the process 500 may collect a plurality of roaming-related metrics associated with a station and one or more roaming target candidates (block 510). The metrics can include, but are not limited to, the current network conditions, the station's previous roaming experiences, and the capabilities of the roaming target candidates. The collected metrics may serve as the input to the machine learning model, which can be used to generate the roaming recommendations.

In a number of embodiments, the process 500 may generate one or more roaming recommendations based on a machine learning process and the collected plurality of roaming-related metrics (block 520). The generated roaming recommendations can include at least one confidence level for at least one roaming target candidate of the one or more roaming target candidates. A roaming target candidate may be a neighbor network node (AP) or a link (e.g., a 5 GHz link or a 6 GHz link) at a neighbor network node. The confidence level may represent the likelihood of a successful roaming action if the station were to roam to the corresponding roaming target candidate.

In a variety of embodiments, the process 500 may transmit the one or more roaming recommendations to the station (block 530). The one or more roaming recommendations can be transmitted utilizing a BTM message. Upon receiving the roaming recommendations, the station can then decide whether to perform a roaming action based on the recommendations.

In some embodiments, the process 500 may implement a reward and penalty system associated with the machine learning model (block 540). The reward and penalty system can be utilized to adjust the weights of the machine learning model based on the success or failure of the roaming actions. Successful roaming actions may result in rewards, which may increase the weights of the successful actions in the model, while failed (or rejected) roaming actions (or roaming actions that lead to degraded performance) can result in penalties, which may decrease the weights of the failed actions in the model.

In more embodiments, the process 500 may receive a roaming feedback from the station (block 550). The feedback can include data about the success or failure of the roaming action. The feedback can include additional data about the network conditions or the station's performance after the roaming action.

In additional embodiments, the process 500 may update the machine learning model based on the roaming feedback (block 560). The update can involve adjusting the weights of the model based on the reward and penalty system. The update can also involve incorporating any new data from the feedback into the model.

Although a specific embodiment for generating, transmitting, and refining roaming recommendations is discussed with respect to FIG. 5, any of a variety of systems and/or processes may be utilized in accordance with embodiments of the disclosure. For example, the process could incorporate a dynamic adjustment mechanism, which allows the roaming recommendations to be updated in real-time based on changing network conditions. The elements depicted in FIG. 5 may also be interchangeable with other elements of FIGS. 1-4 and 6-8 as required to realize a particularly desired embodiment.

Figure 6:
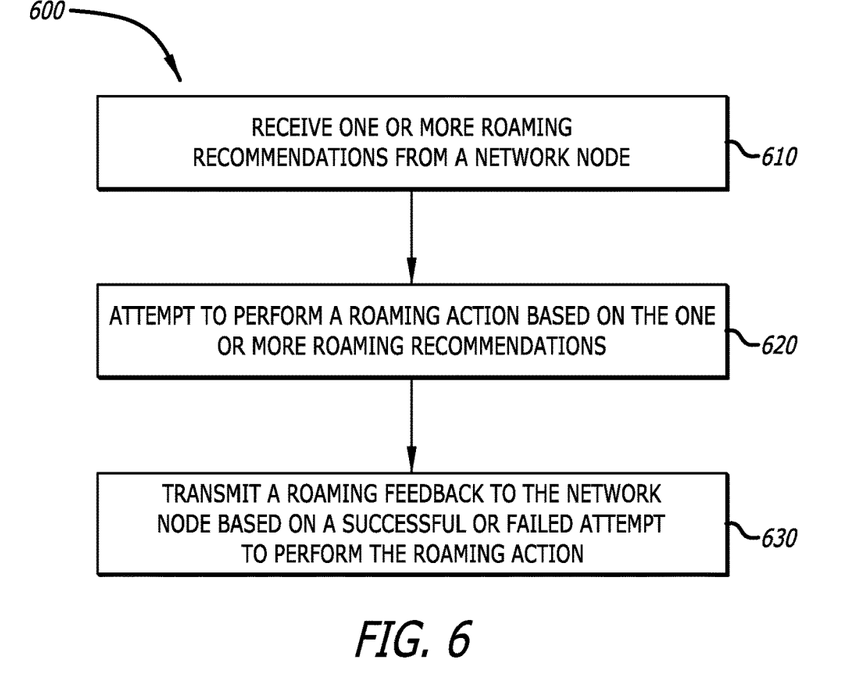
FIG. 6 is a flowchart showing a process for receiving, implementing, and providing feedback on roaming recommendations in accordance with various embodiments of the disclosure.

Referring to FIG. 6, a flowchart showing a process 600 for receiving, implementing, and providing feedback on roaming recommendations in accordance with various embodiments of the disclosure is shown. In many embodiments, the process 600 may receive one or more roaming recommendations from a network node (block 610). The recommendations, generated based on a machine learning process, can include at least one confidence level for at least one roaming target candidate. The station can then use these recommendations to make informed decisions about potential roaming actions.

In a number of embodiments, the process 600 may attempt to perform a roaming action based on the one or more roaming recommendations (block 620). The roaming action can involve moving from the current network node to a different network node, or changing the connection parameters with the current network node (e.g., moving one of two links to a different network node while keeping the other of the two links with the current network node). The success or failure of the roaming action can depend on various factors, including, but not limited to, the accuracy of the roaming recommendations and the current network conditions.

In a variety of embodiments, the process 600 may transmit a roaming feedback to the network node based on a successful or failed attempt to perform the roaming action (block 630). The feedback can include data about the success or failure of the roaming action, as well as any additional data about the network conditions or the station's performance after the roaming action. The feedback can then be used by the network node to update the machine learning model and improve the accuracy of future roaming recommendations.

Although a specific embodiment for receiving, implementing, and providing feedback on roaming recommendations is discussed with respect to FIG. 6, any of a variety of systems and/or processes may be utilized in accordance with embodiments of the disclosure. For instance, the process can be further enhanced with a predictive roaming feature, which may allow the station to predict the optimal timing for a roaming action based on the received roaming recommendations. The elements depicted in FIG. 6 may also be interchangeable with other elements of FIGS. 1-5, 7, and 8 as required to realize a particularly desired embodiment.

Figure 7:
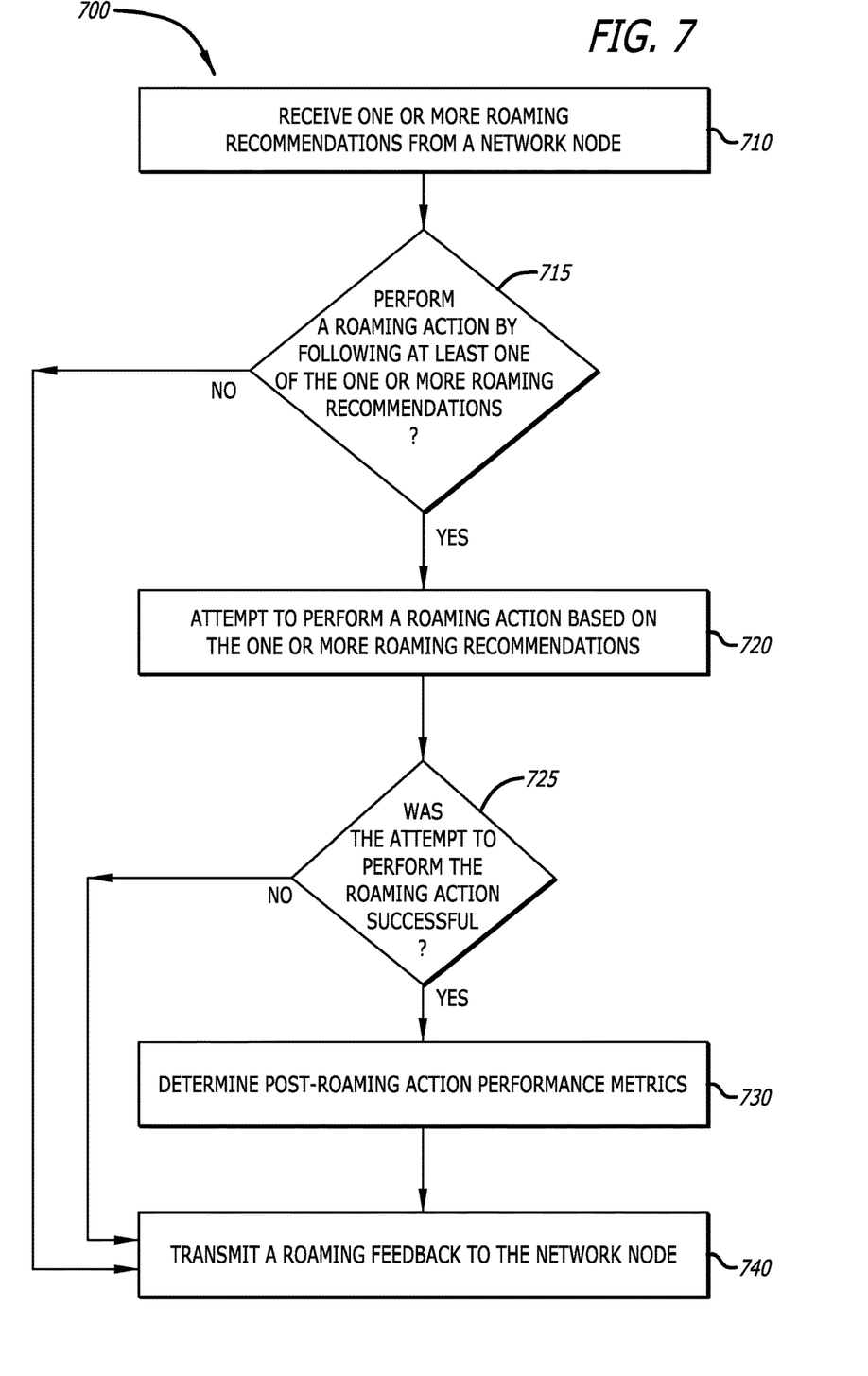
FIG. 7 is a flowchart showing a process for receiving, deciding on, and providing feedback on roaming recommendations in accordance with various embodiments of the disclosure.

Referring to FIG. 7, a flowchart showing a process 700 for receiving, deciding on, and providing feedback on roaming recommendations in accordance with various embodiments of the disclosure is shown. In many embodiments, the process 700 may receive one or more roaming recommendations from a network node (block 710). The recommendations, generated based on a machine learning process, can include at least one confidence level for at least one roaming target candidate. The station can then use these recommendations to make informed decisions about potential roaming actions.

In a number of embodiments, the process 700 can determine whether the station should perform a roaming action by following at least one of the one or more roaming recommendations (block 715). In a variety of embodiments, in response to the decision to follow at least one of the roaming recommendations, the process 700 can attempt to perform a roaming action based on the one or more roaming recommendations. However, in some embodiments, when the decision is not to follow any of the roaming recommendations, the process 700 can transmit a roaming feedback to the network node.

In more embodiments, following the decision to perform a roaming action, the process 700 may attempt to perform a roaming action based on the one or more roaming recommendations (block 720). The roaming action can involve moving from the current network node to a different network node, or changing the connection parameters with the current network node (e.g., moving one of two links to a different network node while keeping the other of the two links with the current network node). The success or failure of the roaming action can depend on various factors, including, but not limited to, the accuracy of the roaming recommendations, the current network conditions, and the capabilities of the station and the target network node.

In additional embodiments, the process 700 can determine if the attempt to perform the roaming action was successful (block 725). In further embodiments, in response to a successful roaming action, the process 700 can determine post-roaming action performance metrics. However, in still more embodiments, when the roaming action was not successful, the process 700 can transmit a roaming feedback to the network node.

In still further embodiments, following a successful roaming action, the process 700 may determine post-roaming action performance metrics (block 730). The metrics can include, but are not limited to, the quality of the connection with the new network node, the station's performance after the roaming action, and the impact of the roaming action on the overall network performance. In particular, the metrics may include application performance metrics such as, but not limited to, jitter, latency, and loss, as well as RF metrics such as, but not limited to, RSSI, SNR, and DL/UL data rates.

In still additional embodiments, the process 700 may transmit a roaming feedback to the network node (block 740). The content of the feedback can vary. If the decision at block 715 was not to follow any of the roaming recommendations, the feedback can include a reason for this decision, such as a lack of confidence in the recommendations or a decision to maintain the current network connection. If the roaming action attempted at block 720 was not successful, the feedback may include data about the reasons for the failure, such as poor network conditions or technical issues with the station or the network node. If the roaming action was successfully, the feedback can include the post-roaming action performance metrics. This feedback can then be used by the network node to update the machine learning model and improve the accuracy of future roaming recommendations.

Although a specific embodiment for receiving, deciding on, and providing feedback on roaming recommendations is discussed with respect to FIG. 7, any of a variety of systems and/or processes may be utilized in accordance with embodiments of the disclosure. For instance, the process can incorporate an adaptive learning mechanism, which may allow the station to learn from its previous roaming actions and improve its decision-making process over time. The elements depicted in FIG. 7 may also be interchangeable with other elements of FIGS. 1-6 and 8 as required to realize a particularly desired embodiment.

Figure 8:
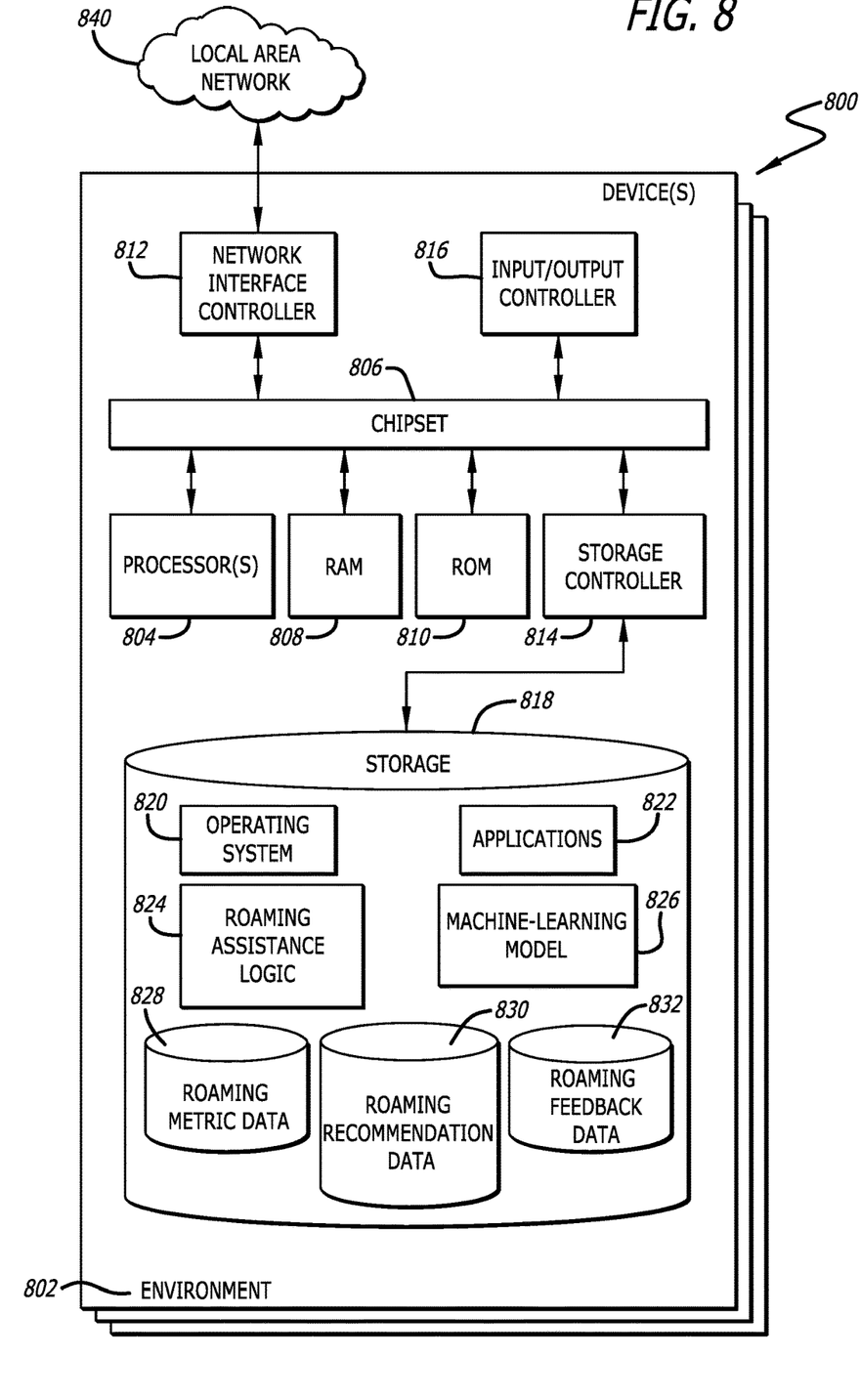
FIG. 8 is a conceptual block diagram for one or more devices capable of executing components and logic for implementing the functionality and embodiments described above.

Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, roaming metric data 828, roaming recommendation data 830, and roaming feedback data 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more computer devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8, and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a roaming assistance logic 824. The roaming assistance logic 824 may be responsible for managing the roaming process. The roaming assistance logic 824 can collect roaming-related metrics, generate roaming recommendations based on a machine learning process, and transmit the recommendations to the station. Additionally, the roaming assistance logic 824 may receive feedback from the station after a roaming action and use the feedback to update the machine learning model.

In a number of embodiments, the storage 818 can include roaming metric data 828. The roaming metric data 828 may relate to the current network conditions, the station's previous roaming experiences, and/or the capabilities of the roaming target candidates. The roaming metric data 828 may play an important role such that the machine learning process may generate accurate and effective roaming recommendations.

In various embodiments, the storage 818 can include roaming recommendation data 830. The roaming recommendation data 830 may include at least one confidence level for each roaming target candidate, indicating the likelihood of a successful roaming action if the station were to roam to that candidate. The station can use these recommendations to make informed decisions about potential roaming actions.

In still more embodiments, the storage 818 can include roaming feedback data 832. The roaming feedback data 832 can include details about the success or failure of the roaming action, as well as any additional data about the network conditions or the station's performance after the roaming action. The roaming feedback data 832 may be utilized to update the machine learning model and improve the accuracy of future roaming recommendations.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to analyze the collected roaming-related metrics and generate roaming recommendations. The ML model 826 can also be designed to learn and improve over time, using feedback from the station to refine its predictions and recommendations.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising:
 a processor;
 at least one network interface controller configured to provide access to a network; and
 a memory communicatively coupled to the processor, wherein the memory comprises a roaming assistance logic that is configured to:
  collect a plurality of roaming-related metrics associated with a station and one or more roaming target candidates;
  generate one or more roaming recommendations based on a machine learning process and the collected plurality of roaming-related metrics, the one or more roaming recommendations including at least one confidence level for at least one roaming target candidate of the one or more roaming target candidates; and
  transmit the one or more roaming recommendations to the station.

2. The network node of claim 1, wherein the one or more roaming target candidates correspond to one or more neighbor network nodes of the network node or one or more links of the one or more neighbor network nodes.

3. The network node of claim 1, wherein the machine learning process is associated with a machine learning model trained at least in part on some of the plurality of roaming-related metrics.

4. The network node of claim 3, wherein the machine learning model includes a reinforcement learning model.

5. The network node of claim 3, wherein the roaming assistance logic is further configured to:
 receive a roaming feedback from the station; and
 update the machine learning model based on the roaming feedback.

6. The network node of claim 5, wherein the roaming feedback includes an indication of a successful roaming action at the station in accordance with at least one of the one or more roaming recommendations.

7. The network node of claim 6, wherein the roaming feedback further includes at least one indication of one or more post-roaming action performance metrics.

8. The network node of claim 5, wherein the roaming feedback includes an indication of a failed roaming attempt at the station in accordance with at least one of the one or more roaming recommendations.

9. The network node of claim 8, wherein the roaming feedback further includes an indication of a reason associated with the failed roaming attempt.

10. The network node of claim 5, wherein the roaming feedback includes an implicit roaming feedback.

11. The network node of claim 5, wherein to update the machine learning model, the roaming assistance logic is further configured to record a reward or a penalty based on the roaming feedback.

12. The network node of claim 1, wherein the plurality of roaming-related metrics includes an operation mode of the station or an operation mode of at least one of the one or more roaming target candidates.

13. The network node of claim 1, wherein the plurality of roaming-related metrics includes at least one result associated with at least one previous roaming recommendation.

14. The network node of claim 13, wherein the at least one result includes one or more post-roaming action performance metrics.

15. The network node of claim 1, wherein the plurality of roaming-related metrics includes a roaming pattern associated with one or more stations.

16. The network node of claim 1, wherein the one or more roaming recommendations further include an indication to perform a roaming action without scanning.

17. The network node of claim 1, wherein the one or more roaming recommendations are associated with one or more links of a plurality of links for a multi-link operation (MLO) setup.

18. The network node of claim 1, wherein the one or more roaming recommendations further include an indication of a timing of a roaming action for the station.

19. A station, comprising:
 a processor;
 at least one network interface controller configured to provide access to a network; and
 a memory communicatively coupled to the processor, wherein the memory comprises a roaming assistance logic that is configured to:
  receive one or more roaming recommendations from a network node, the one or more roaming recommendations being based on a machine learning process and including at least one confidence level for at least one roaming target candidate of one or more roaming target candidates;
  attempt to perform a roaming action based on the one or more roaming recommendations; and
  transmit a roaming feedback to the network node based on a successful or failed attempt to perform the roaming action.

20. A method for recommending a roaming action, comprising:
 collecting a plurality of roaming-related metrics associated with a station and one or more roaming target candidates;
 generating one or more roaming recommendations based on a machine learning process and the collected plurality of roaming-related metrics, the one or more roaming recommendations including at least one confidence level for at least one roaming target candidate of the one or more roaming target candidates; and
 transmitting the one or more roaming recommendations to the station.

* * * * *